US011155204B2

(12) United States Patent
Maiorana

(10) Patent No.: US 11,155,204 B2
(45) Date of Patent: Oct. 26, 2021

(54) GAS HAULER WITH AN AWNING WITH A BUILT IN LIGHT

(71) Applicant: MAC LTT, INC., Kent, OH (US)

(72) Inventor: James A. Maiorana, Hartville, OH (US)

(73) Assignee: MAC LTT, INC., Kent, OH (US)

( * ) Notice: Subject to any disclaimer, the term of this patent is extended or adjusted under 35 U.S.C. 154(b) by 58 days.

(21) Appl. No.: 15/816,404

(22) Filed: Nov. 17, 2017

(65) Prior Publication Data

US 2018/0354409 A1 Dec. 13, 2018

Related U.S. Application Data

(63) Continuation-in-part of application No. 15/620,138, filed on Jun. 12, 2017, now Pat. No. 10,351,055,
(Continued)

(51) Int. Cl.
| | |
|---|---|
| *B60Q 1/24* | (2006.01) |
| *B60P 3/22* | (2006.01) |
| *B60Q 1/05* | (2006.01) |
| *B60Q 1/04* | (2006.01) |
| *E04F 10/06* | (2006.01) |

(52) U.S. Cl.
CPC .............. *B60Q 1/24* (2013.01); *B60P 3/224* (2013.01); *B60P 3/2205* (2013.01); *B60P 3/226* (2013.01); *B60P 3/2245* (2013.01); *B60Q 1/0483* (2013.01); *B60Q 1/05* (2013.01); *E04F 10/0618* (2013.01)

(58) Field of Classification Search
CPC ....... B60P 3/224; B60P 3/2245; B60P 3/2205; B60P 3/22; B60P 3/2225; B60Q 1/24; B60Q 1/05; B60R 3/005
See application file for complete search history.

(56) References Cited

U.S. PATENT DOCUMENTS

| | | | | |
|---|---|---|---|---|
| 1,365,110 | A * | 1/1921 | Kramer | ..................... B60P 3/22 |
| | | | | 280/838 |
| 2,989,213 | A * | 6/1961 | Daggitt | ................. B60P 3/2205 |
| | | | | 222/83 |

(Continued)

FOREIGN PATENT DOCUMENTS

EP 2902565 A1 * 8/2015 .......... E04F 10/0611

*Primary Examiner* — Kevin Hurley
*Assistant Examiner* — Harold Eric Pahlck, III
(74) *Attorney, Agent, or Firm* — Sand, Sebolt & Wernow Co., LPA

(57) ABSTRACT

A tank trailer includes a tank having an outer surface face and an inner surface and a central longitudinal vertical plane extending between the first end and the second end. The outer surface faces away from the central longitudinal vertical plane and the inner surface faces towards the central longitudinal vertical plane. The outer surface and the inner surface define an interior volume adapted to be filled with material. The tank trailer may further include a set of ground-engaging wheels supporting the tank trailer from below, a bar positioned proximate the outer surface of the tank and a light source provided on the bar. The tank may further include a frame member operatively engaged with the bar and a sheet material extending between the bar and the frame member. The frame member is movable between a first position and a second position.

20 Claims, 13 Drawing Sheets

Related U.S. Application Data which is a continuation-in-part of application No. 15/620,138, filed on Jun. 12, 2017, now Pat. No. 10,300,845.

(56) References Cited

U.S. PATENT DOCUMENTS

| | | | |
|---|---|---|---|
| 3,788,268 A | 1/1974 | Hiatt et al. | |
| 4,311,208 A | 1/1982 | Macrorie et al. | |
| 4,371,056 A | 2/1983 | Anglade | |
| 4,679,657 A | 7/1987 | Bennett et al. | |
| 4,825,192 A | 4/1989 | Wells | |
| 4,848,517 A | 7/1989 | Broyles | |
| 5,497,304 A | 3/1996 | Caine | |
| 5,878,767 A * | 3/1999 | Etling | B67D 7/0476 137/15.01 |
| 5,907,284 A | 5/1999 | Israel | |
| 5,971,105 A | 10/1999 | Jacobson | |
| 6,118,372 A | 9/2000 | Leow | |
| 6,213,047 B1 | 4/2001 | Means et al. | |
| 6,431,093 B1 * | 8/2002 | Hansen | B60R 3/005 108/135 |
| 6,921,184 B2 | 7/2005 | Tufte | |
| 7,690,858 B1 | 4/2010 | Chiavola | |
| 7,841,269 B1 | 11/2010 | Jacobs | |
| 8,075,169 B2 | 12/2011 | Englander | |
| 8,118,250 B1 | 2/2012 | Helseth et al. | |
| 8,232,888 B2 | 7/2012 | Frederick et al. | |
| 8,316,910 B2 * | 11/2012 | Popa | E04F 10/0618 160/46 |
| 8,371,742 B2 * | 2/2013 | Doron | B60P 3/224 366/270 |
| 8,610,598 B2 | 12/2013 | Hider et al. | |
| 8,616,721 B1 * | 12/2013 | Woodall, Jr. | F21V 33/006 135/88.11 |
| RE44,787 E | 3/2014 | Burgess | |
| 8,698,610 B2 | 4/2014 | Krugh, IV | |
| 8,698,612 B2 | 4/2014 | Toll | |
| 8,740,267 B1 | 6/2014 | Wilson | |
| 9,096,172 B2 * | 8/2015 | Cotta, Sr. | B60Q 1/0483 |
| 9,442,194 B2 | 9/2016 | Kurihara et al. | |
| 9,694,883 B1 | 7/2017 | Bonventre | |
| 2004/0173406 A1 | 9/2004 | Lantz | |
| 2005/0173189 A1 | 8/2005 | Berardi | |
| 2008/0179908 A1 | 7/2008 | Haber | |
| 2010/0118557 A1 | 5/2010 | Ortwein et al. | |
| 2010/0224444 A1 | 9/2010 | Simeonov et al. | |
| 2011/0148645 A1 | 6/2011 | Sarmiento | |
| 2011/0202161 A1 | 8/2011 | Krieger et al. | |
| 2013/0146494 A1 | 6/2013 | Gilpatrick | |
| 2013/0235558 A1 | 9/2013 | Zhou | |
| 2013/0265784 A1 | 10/2013 | Nieberle | |
| 2013/0313978 A1 | 11/2013 | Fields et al. | |
| 2014/0016338 A1 | 1/2014 | Yang | |
| 2014/0041964 A1 | 2/2014 | Bedyk | |
| 2014/0056013 A1 | 2/2014 | Hancock, Jr. et al. | |
| 2014/0353081 A1 | 12/2014 | Linch et al. | |
| 2015/0075908 A1 | 3/2015 | Moss et al. | |
| 2015/0203026 A1 * | 7/2015 | Schotanus | B60Q 1/326 362/520 |
| 2015/0241034 A1 | 8/2015 | Dankelmann et al. | |
| 2016/0230461 A1 | 8/2016 | Finegan | |
| 2016/0273744 A1 | 9/2016 | Stout | |
| 2016/0281885 A1 | 9/2016 | Shearer et al. | |
| 2016/0305619 A1 | 10/2016 | Howe | |
| 2016/0360593 A1 | 12/2016 | Lee | |
| 2017/0068303 A1 | 3/2017 | Land et al. | |
| 2017/0188439 A1 | 6/2017 | Martinez | |
| 2017/0232930 A1 | 8/2017 | Murar et al. | |
| 2017/0283240 A1 * | 10/2017 | Wruck | B60P 3/2215 |
| 2017/0314328 A1 | 11/2017 | Friedman | |
| 2017/0344097 A1 | 11/2017 | Land et al. | |
| 2018/0122218 A1 | 5/2018 | Shanley | |

\* cited by examiner

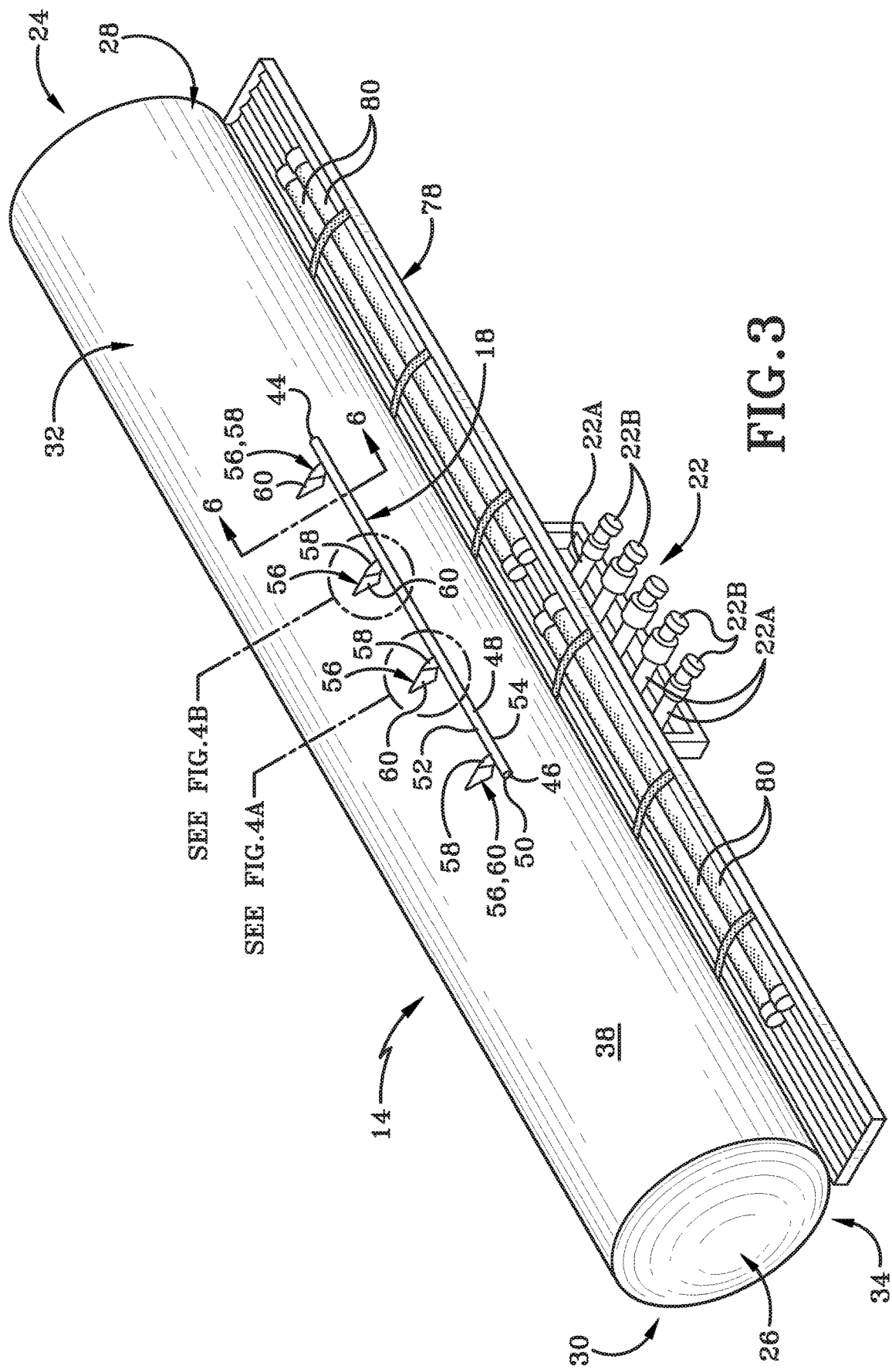

GAS HAULER WITH AN AWNING WITH A BUILT IN LIGHT

CROSS REFERENCE TO RELATED APPLICATIONS

This application is a continuation-in-part of U.S. patent application Ser. No. 15/620,138 filed on Jun. 12, 2017; the disclosure of which is incorporated herein by reference.

This application is a continuation-in-part of U.S. patent application Ser. No. 15/620,231, filed on Jun. 12, 2017; the disclosure of which is incorporated herein by reference.

BACKGROUND

Technical Field

The present disclosure relates generally to protective devices. More particularly, the present disclosure relates to protective devices for tank trailers. Specifically, the present disclosure is directed to a lighted protective device for a tank trailer.

Background Information

Operators of tanker trucks often have to make various stops along their routes to perform various tasks. One exemplary task that an operator of a tanker truck may perform is the transfer of fuel into and from a tank of the tanker truck. Typically, fuel is transferred into the tank of the tanker truck from a loading hose positioned above the tank. The loading hose is brought vertically downward to be connected to a connector. While the loading hose is being brought down for connection, there is a risk of damage to the tank from contact made by the loading hose. Additionally, this task, as well as unloading of the fuel to a reservoir, is typically performed at night and there is therefore a risk that an operator standing next to his or her truck may not be able to see in the dark conditions.

SUMMARY

The inventor has recognized that it is important to provide protective devices for tank trailers to aid a truck operator while, amongst other tasks, loading and unloading fuel into the tank of a tank trailer.

The present disclosure offers both a system and method for increasing the safety of truck operators while, amongst other tasks, loading and unloading fuel.

In one aspect, the present disclosure may provide a tank trailer comprising a tank including a first end and a second end defining a longitudinal direction therebetween, a first side and a second side defining a transverse direction therebetween and a top and a bottom defining a vertical direction therebetween. The tank may further include an outer surface face and an inner surface and a central longitudinal vertical plane extending between the first end and the second end. The outer surface faces away from the central longitudinal vertical plane and the inner surface faces towards the central longitudinal vertical plane. The outer surface and the inner surface define an interior volume adapted to be filled with material. The tank trailer may further include a set of ground-engaging wheels supporting the tank trailer from below, a bar positioned proximate the outer surface of the tank for protecting the tank and a light source provided on the bar for emitting light towards a work area.

The tank trailer may further include a fuel assembly including a connector in operative communication with the interior volume of the tank adapted to receive a hose to transfer fuel. The bar is positioned above the connector and the bar is adapted to protect the tank from being contacted by the hose when the hose is being connected to the connector to transfer the fuel.

In another aspect, the present disclosure may provide a tank trailer comprising a tank including a first end and a second end defining a longitudinal direction therebetween, a first side and a second side defining a transverse direction therebetween and a top and a bottom defining a vertical direction therebetween. The tank may further include an outer surface face and an inner surface and a central longitudinal vertical plane extending between the first end and the second end. The outer surface faces away from the central longitudinal vertical plane and the inner surface faces towards the central longitudinal vertical plane. The outer surface and the inner surface define an interior volume adapted to be filled with material. The tank trailer may further include a set of ground-engaging wheels supporting the tank trailer from below, a bar positioned proximate the outer surface of the tank for protecting the tank, a frame member operatively engaged with the bar and a sheet material extending between the bar and the frame member for protecting an area below the bar, the frame member and the sheet material. The frame member is movable between a first position and a second position. The sheet material is adapted to provide cover to an area below the bar and the frame member when the frame member is in the second position.

The tank trailer my further include a connector in operative communication with the interior volume of the tank adapted to receive a hose to transfer fuel. The bar and the frame member are positioned above the connector. The bar and the frame member are adapted to protect the tank from being contacted by the hose when the hose is being connected to the connector to transfer the fuel. The bar and the frame member may also provide cover vertically above the connector.

The frame member is transversely movable relative to the central longitudinal vertical plane and parallel to a central longitudinal horizontal plane. The tank trailer my further include a light source provided on the frame member for emitting light towards a work area.

In another aspect, the present disclosure may provide a tank trailer including a tank having an outer surface face and an inner surface and a central longitudinal vertical plane extending between the first end and the second end. The outer surface faces away from the central longitudinal vertical plane and the inner surface faces towards the central longitudinal vertical plane. The outer surface and the inner surface define an interior volume adapted to be filled with material. The tank trailer may further include a set of ground-engaging wheels supporting the tank trailer from below, a bar positioned proximate the outer surface of the tank for protecting the tank and a light source provided on the bar for emitting light towards a work area. The tank may further include a frame member operatively engaged with the bar and a sheet material extending between the bar and the frame member. The frame member is movable between a first position and a second position.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 is a top right rear isometric perspective view of the tank of FIG. 1 showing the bar above a hose rack, conduits and connectors.

Similar numbers refer to similar parts throughout the drawings.

DETAILED DESCRIPTION

Figure 1:
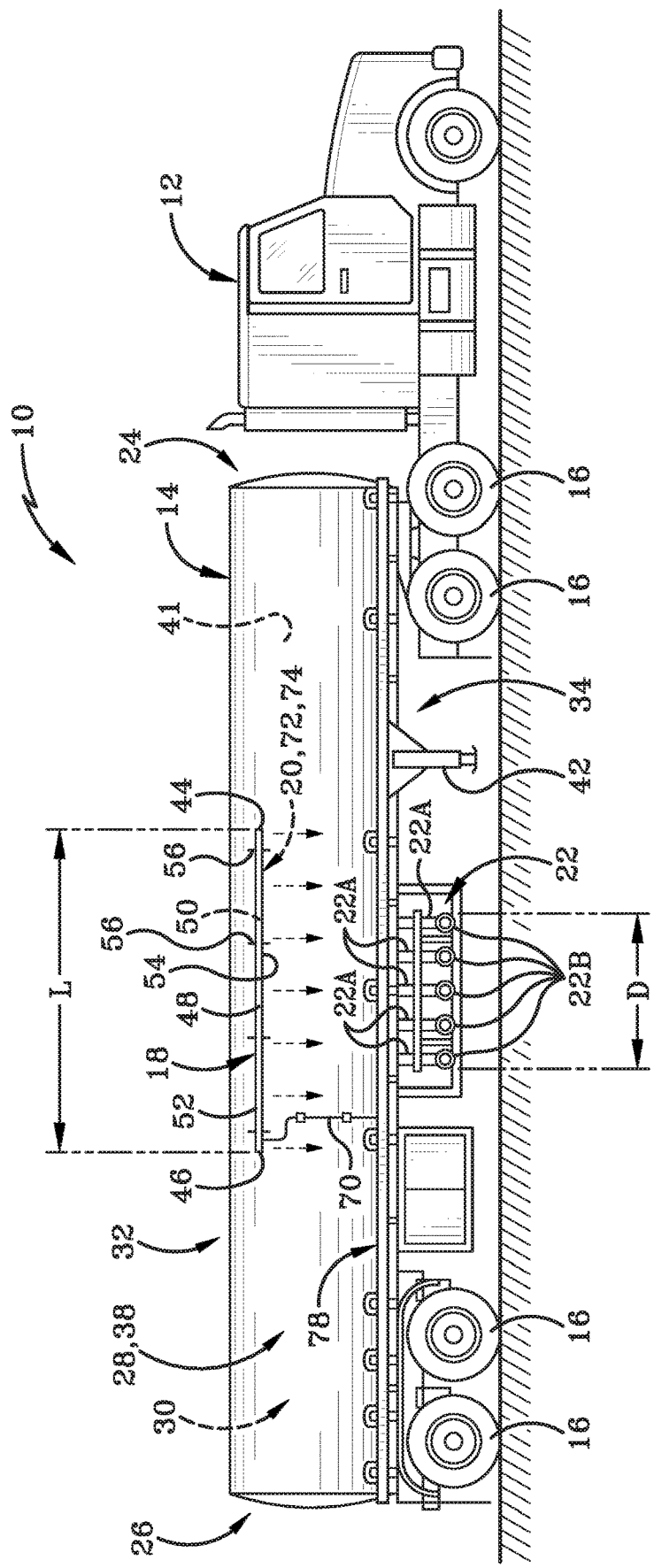
FIG. 1 is a right side elevation view of a tank trailer having a tank including a bar and a light source in accordance with one embodiment of the present disclosure.

A tank trailer in accordance with one embodiment of the present disclosure is shown generally at 10 in FIG. 1. Trailer 10 may be a towed vehicle which is towed by a towing vehicle 12 such as an on-road tractor. In accordance with the first embodiment, trailer 10 may include a tank 14, a set of ground-engaging wheels 16, a bar 18 for protecting the tank, a light source 20 for lighting a work area in dark conditions and a fuel assembly 22 including at least one conduit 22A and at least one connector 22B, such as an API adapter, for loading and/or unloading fuel into and from the tank 14.

Tank 14 may include a first end 24 and a second end 26 defining a longitudinal direction therebetween, a first or left side 28 and a second or right side 30 defining a transverse direction therebetween and a top 32 and a bottom 34 defining a vertical direction therebetween.

For clarity, an explanation of some terms used herein is provided. Tank 14 may include an imaginary longitudinal center line CL1 (FIG. 2) or center plane which may be a vertical longitudinally extending plane cutting through the center of the tank 14 midway between the first and second sides thereof 28, 30 respectively. In accordance with one aspect of the present disclosure, various components may be transversely offset or spaced from the center line CL1.

The description of tank 14 may make reference to certain components, sides, surfaces, points and the like as being inboard or outboard of one another, or this may be readily apparent from the Figures even without specific description. Such terms typically relate to the left or right halves of the tank 14, whereby, for instance, with regard to the left half (left of central plane CL1), a first point which is outboard of a second point is further to the left than the second point or further outboard than the second point in a first or left outboard direction, and thus the second point is inboard of or to the right of the first point. Thus, within the left half, the first point is further outboard or further from the central plane CL1 than is the second point. Likewise, with regard to the right half (right of central plane CL1), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from the central plane CL1 than is the fourth point.

Various surfaces may be said to face transversely inward or transversely outward, which may respectively mean facing generally toward or away from center line/plane CL1. Thus, on the left half of tank 14, a surface which faces transversely inward may be said to face generally to the right or rightward, and a surface which faces transversely outward may be said to face generally to the left or leftward. On the right half of tank 14, a surface which faces transversely inward may be said to face generally to the left or leftward, and a surface which faces transversely outward may be said to face generally to the right or rightward.

Similarly, various components, surfaces etc. may be said to extend transversely inward or transversely outward, which may respectively mean extending generally toward or away from center line/plane CL1. Thus, on the left half of tank 14, a component etc. which extends transversely inward may be said to extend generally to the right or rightward, and a component, etc. which extends transversely outward may be said to extend generally to the left or leftward. On the right half of tank 14, a component, etc. which extends transversely inward may be said to extend generally to the left or leftward, and a component etc. which extends transversely outward may be said to extend generally to the right or rightward.

Tank 14 may include an imaginary longitudinal center line CL2 (FIG. 2) or center plane which may be a horizontal longitudinally extending plane cutting through the center of the tank 14 midway between the top 32 of the tank 14 and the bottom 34 of the tank 14. In accordance with one aspect of the present disclosure, various components may be vertically offset or spaced from the center line CL2.

The description of tank 14 may make reference to certain components, sides, surfaces, points and the like as being above or below one another, or this may be readily apparent from the Figures even without specific description. Such terms typically relate to the top or bottom halves of the tank 14 whereby, for instance, with regard to the top half (above central plane CL2), a first point which is vertically above a second point is further vertically upwards than the second point, and thus the second point is vertically below the first point. Thus, within the top half, the first point is further vertically upwards or further from the central plane CL2 than is the second point. Likewise, with regard to the bottom half (bottom of central plane CL2), a third point which is vertically below a fourth point is further vertically downwards than the fourth point, and thus the fourth point is vertically above the third point. Thus, within the bottom half, the third point is vertically downwards or further from the central plane CL2 than is the fourth point.

Tank 14 may include an imaginary vertical tangent line TL (FIG. 2) or vertical plane which may be a vertically extending plane defined by a tangent to an outermost point 36 on the first side 28 of the tank 14. In accordance with one aspect of the present disclosure, various components may be transversely offset or spaced from the tangent line TL.

Figure 2:
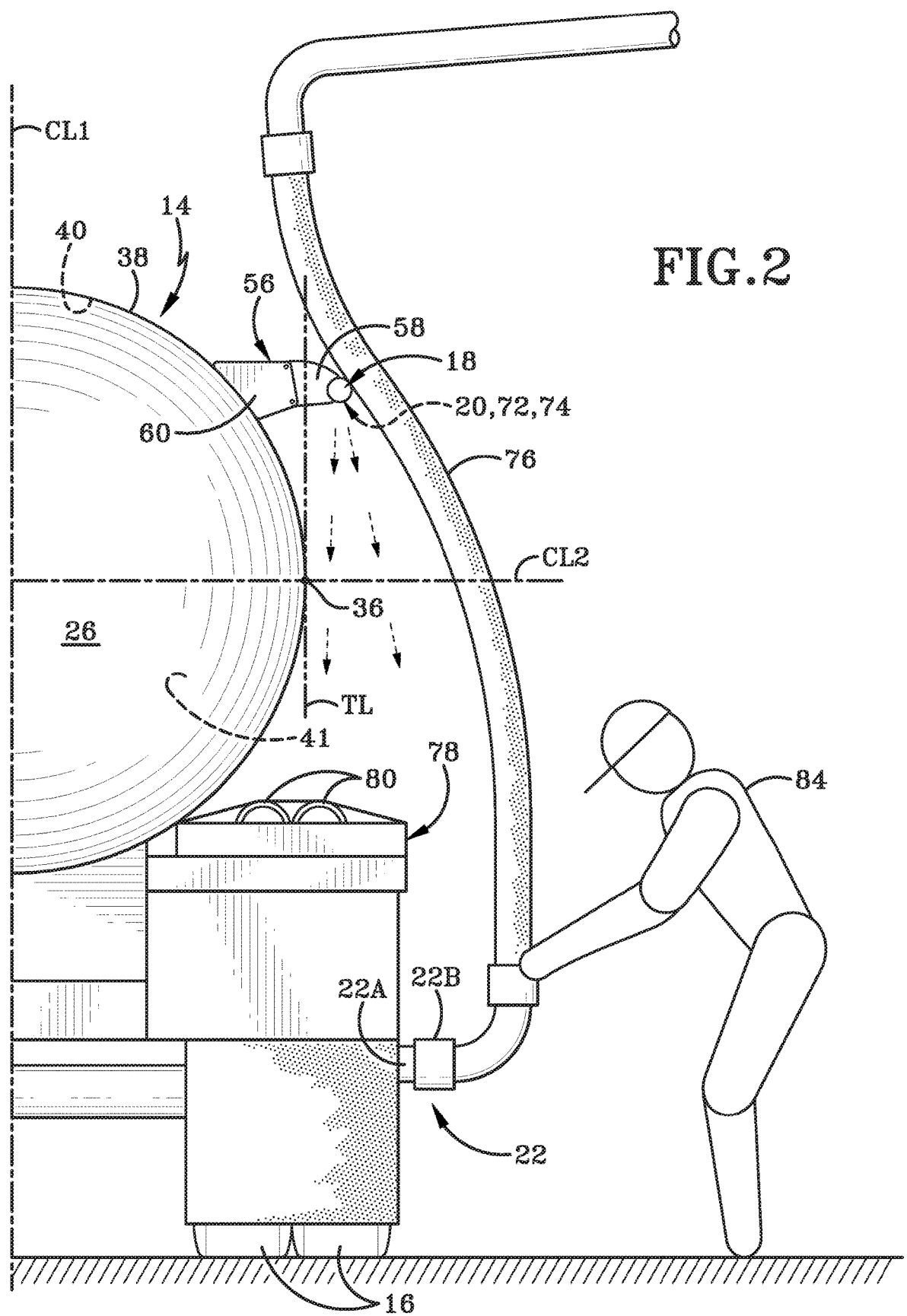
FIG. 2 is a rear fragmentary elevation view of the tank trailer of FIG. 1 where the bar is preventing a loading hose from contacting the tank while the tank is being loaded with fuel.
Figure 4A:
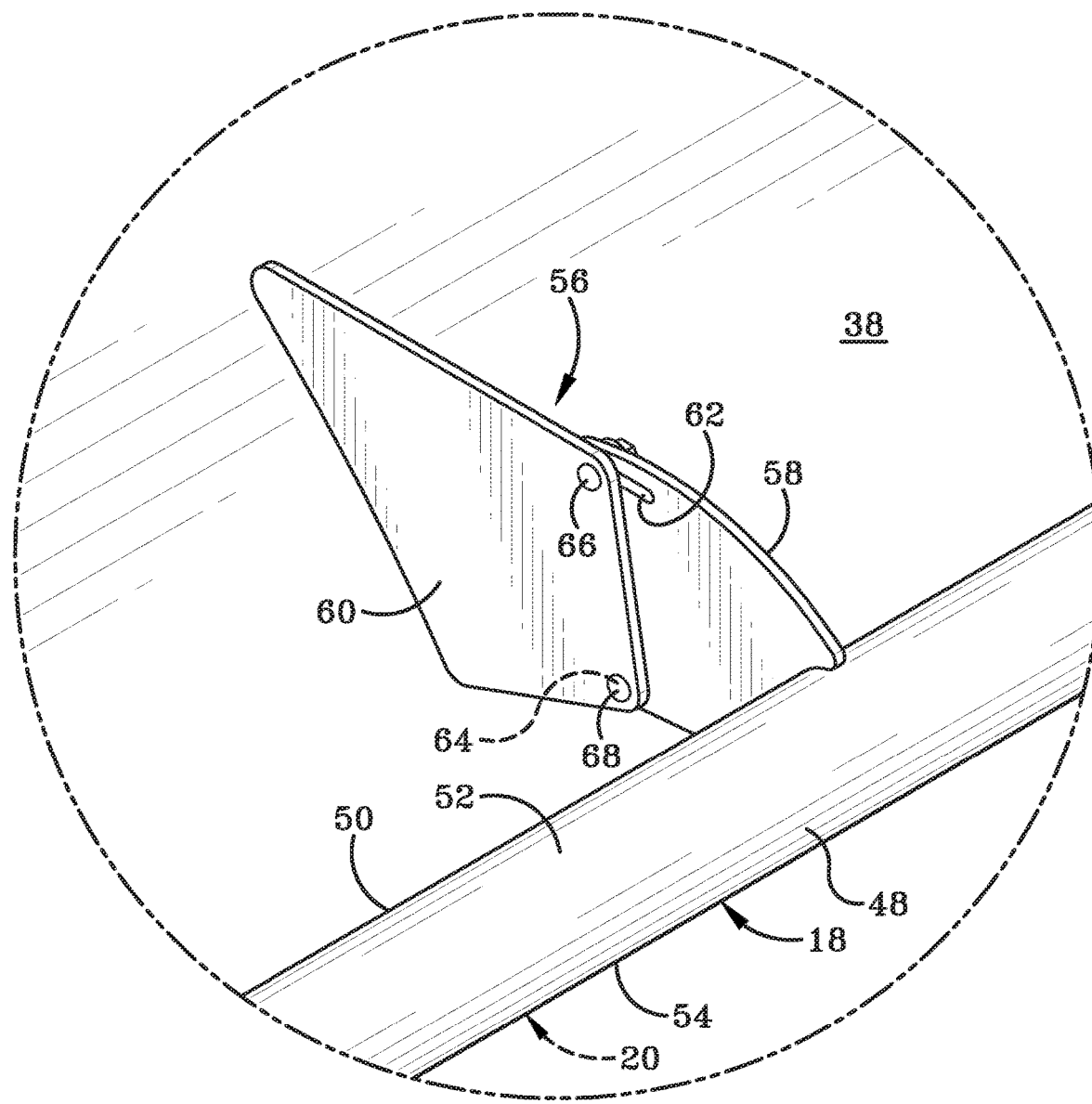
FIG. 4A is an enlarged fragmentary view taken along the highlighted portion of FIG. 3 labeled "SEE FIG. 4A" showing one side of a mounting bracket.
Figure 4B:
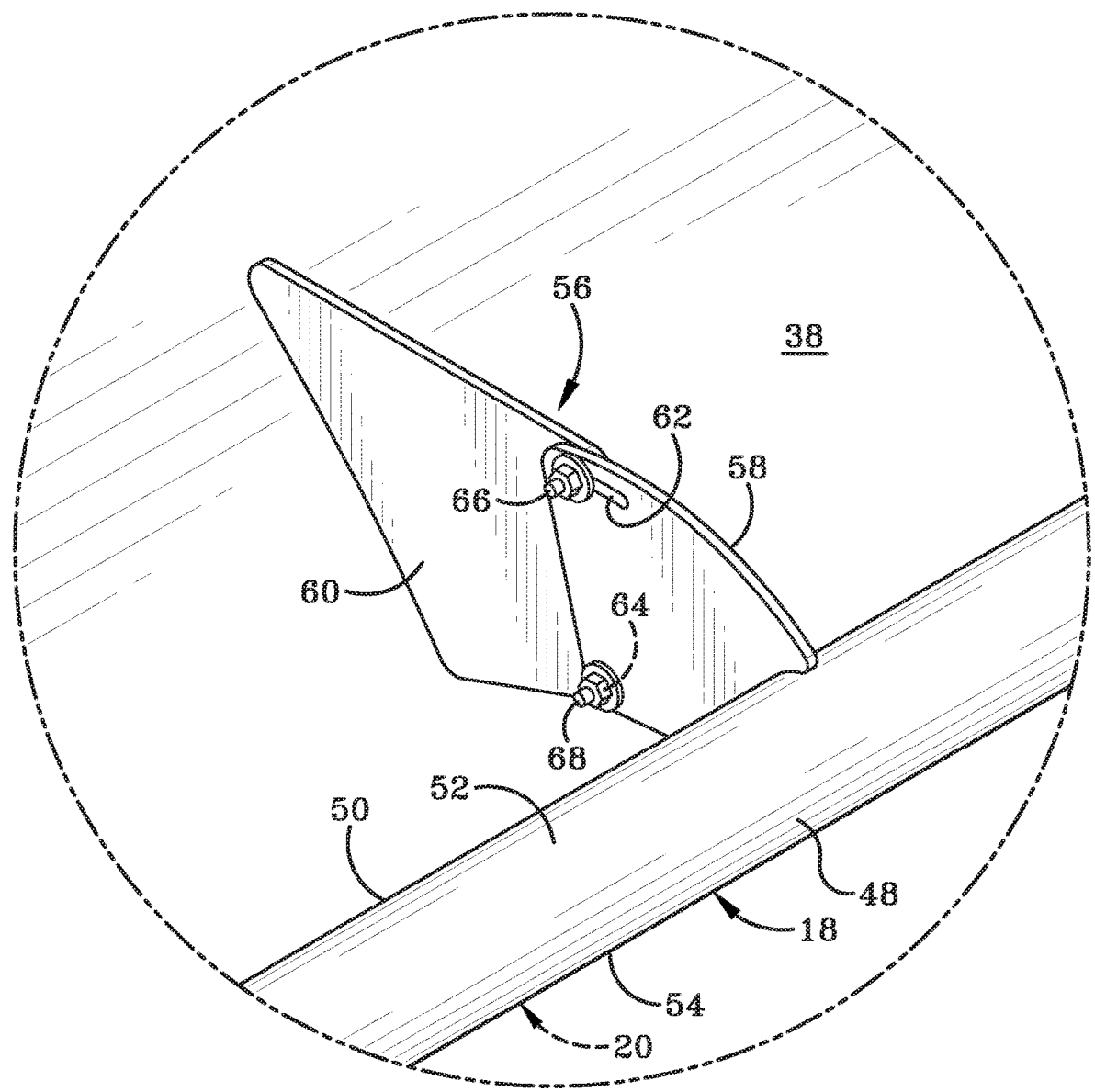
FIG. 4B is an enlarged fragmentary view taken along the highlighted portion of FIG. 3 labeled "SEE FIG. 4B" showing one side of a mounting bracket.
Figure 5:
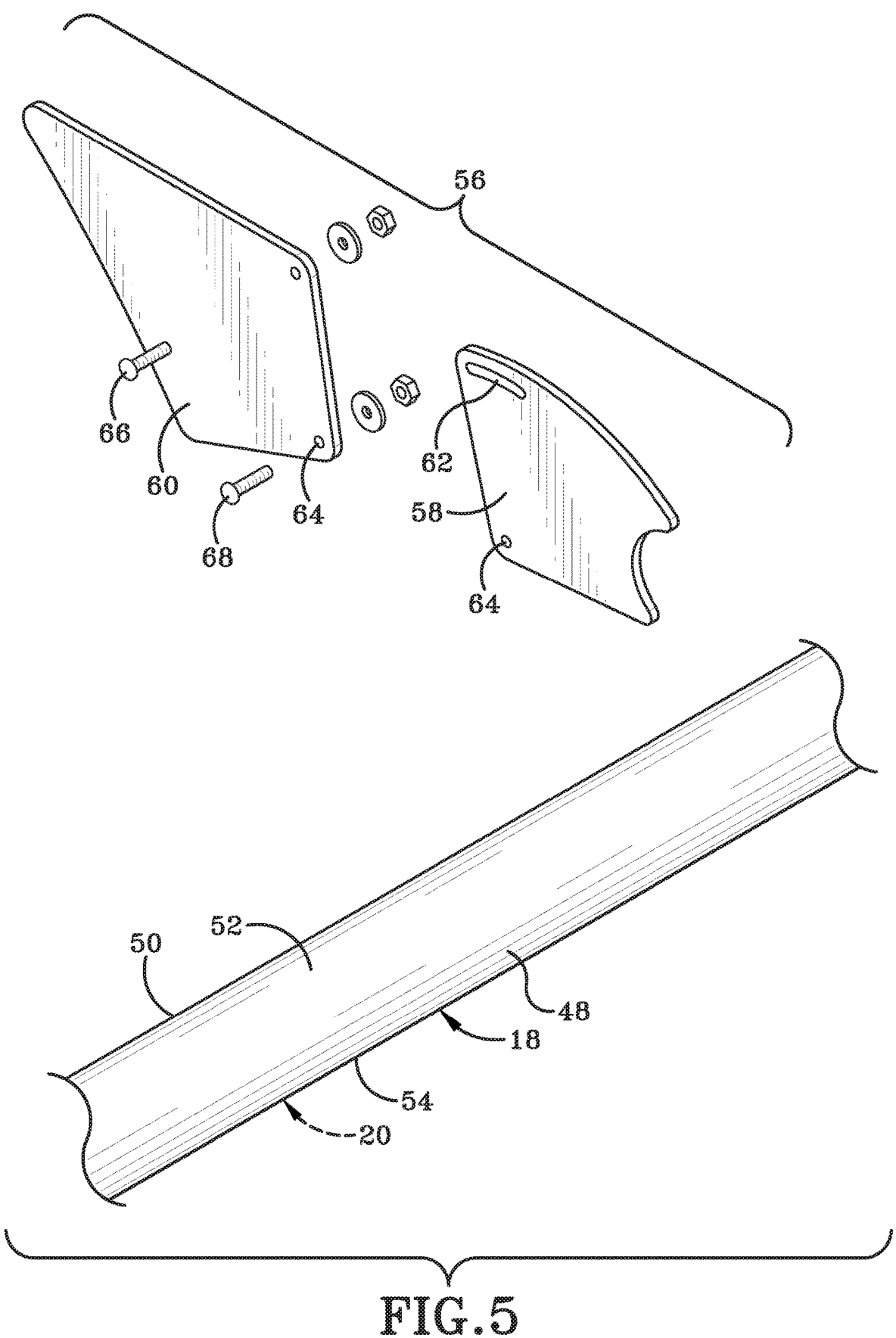
FIG. 5 is an exploded isometric view of the mounting bracket.

With primary reference to FIG. 2, tank 14 may have an outer surface 38 facing away from the center line/plane CL1 and an inner surface 40 facing towards the center line/plane CL1 defining an interior volume 41 adapted to be filled with material (not shown), such as fuel. Tank 14 may be formed primarily of a metal, for instance, an aluminum alloy or any other suitable metal.

Left and right sets of ground engaging wheels 16 may be rotatably mounted on trailer 10 about respective horizontal transversely extending axes via a suitable suspension assembly (not shown) as one of ordinary skill in the art would understand. Trailer 10 may include landing gear 42 (FIG. 1) generally adjacent first end 24 of tank 14. Landing gear 42 may be any suitable type known in the art and be configured to move between a lowered position in contact with the ground for supporting the front of trailer 10 when disconnected from the tractor 12 or other towing vehicle and a raised position out of contact with the ground when trailer 10 is hitched to the tractor 12 or other towing vehicle for over the road travel.

Bar 18 may be a generally elongated member that is generally cylindrical in shape and has a circular cross-section; however bar 18 may be any suitable shape having any suitable cross-section such as a rectangular or square cross-section. Bar 18 may be made of any suitable material such as metal or plastic. As shown in FIG. 1, bar may be mounted on first side 28 of tank 14 proximate the outer surface 38 of the tank 14. More specifically, bar 18 may be mounted above the fuel assembly 22, which includes the at least one conduit 22A and the at least one connector 22B, to protect the tank 14 from being contacted by an object, such as a hose, when fuel is being loaded into the tank 14.

As shown in FIG. 1-FIG. 6, bar 18 may include a first end 44, a second end 46, a first side 48, a second side 50, a top 52 and a bottom 54. Bar 18 may have a length "L" (FIG. 1) that is measured from first end 44 of bar 18 to second end 46 of bar 18. The bottom 54 or bottom surface of bar 18 may define a slot 55 which may extend the length thereof.

As shown in FIG. 2-FIG. 6, bar 18 may be fixedly secured to a mounting bracket 56 in any suitable manner such as by welding the bar 18 to the mounting bracket 56. Bar 18 may be mounted to the outer surface 38 of tank 14 via the mounting bracket 56. Mounting bracket 56 may be fixedly secured to the outer surface 38 in any suitable manner, such as by welding the mounting bracket 56 to the outer surface 38. As shown in FIG. 1 and FIG. 3, bar 18 may be positioned above the fuel assembly 22 which includes the at least one conduit 22A and the at least one connector 22B.

As shown in FIG. 2, the bar 18 may be positioned transversely away from the longitudinal center line CL1 and vertically above the longitudinal center line CL2. Further, and as shown in FIG. 2, the bar 18 may be positioned on an opposite side of the vertical tangent line TL than the first side 28 of the tank 14.

Figure 6:
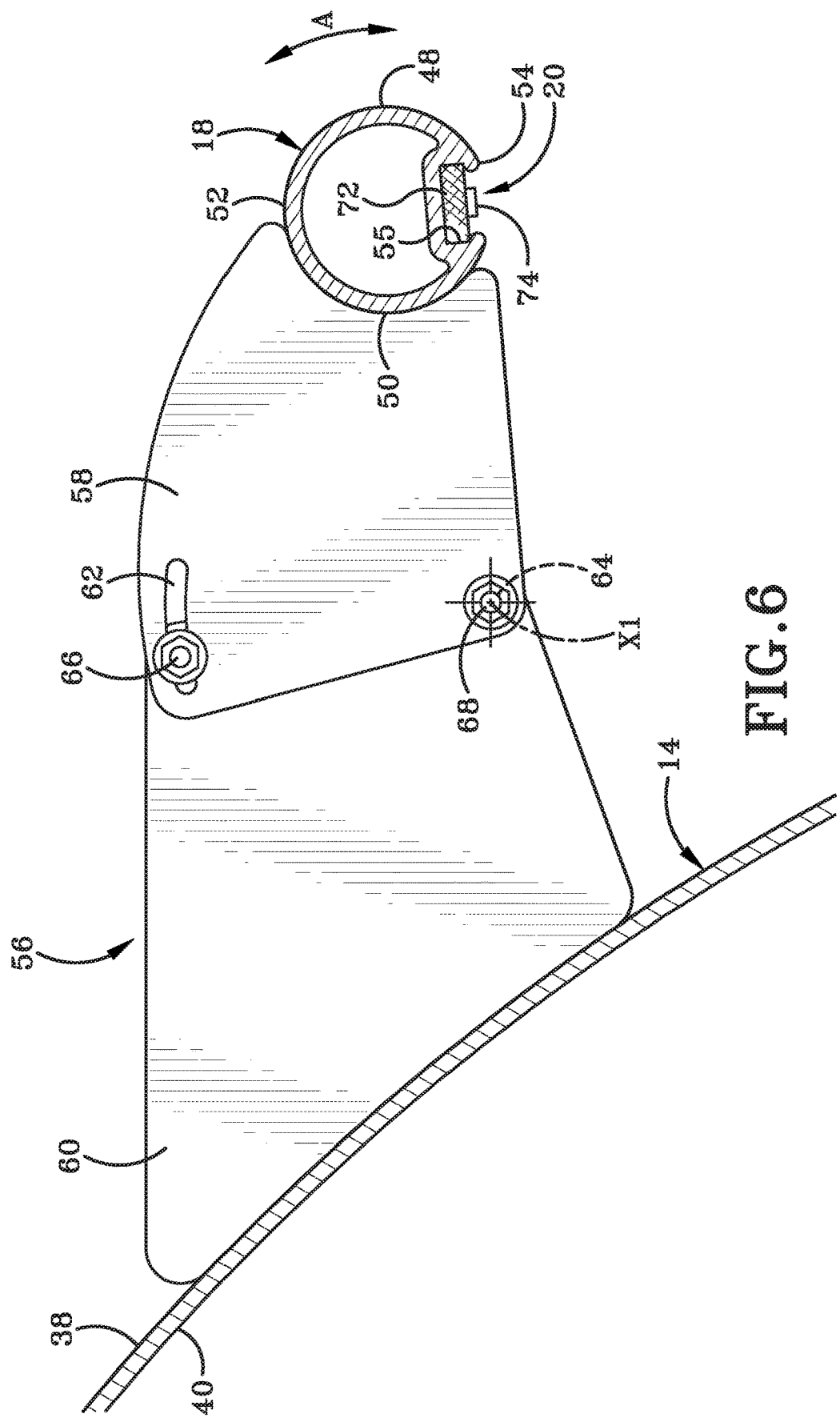
FIG. 6 is a cross-sectional view taken along lines 6-6 of FIG. 3 showing the mounting bracket secured to the outer surface of tank including a slot fastener and pivot fastener and the bar including the light source.

As shown in FIG. 6, mounting bracket 56 may include a first mounting member 58 and a second mounting member 60. First mounting member 58 may include a slot 62 and a pivot hole 64 and may be rotatably secured to the second mounting member 60 via a slot fastener 66 and a pivot fastener 68. Pivot fastener 68 may define a pivot axis X1 about which first mounting member 58 is rotatable between a range of positions within the slot 62. The pivotal motion of first mounting member 58 is indicated in FIG. 6 by an arrow "A". Slot fastener 66 and pivot fastener 68 may be secured via suitable hardware such as nuts and bolts.

As shown in FIG. 1, FIG. 2 and FIG. 6, light source 20 may be provided on bar 18 to emit light towards a work area. More specifically, and in one example, light source 20 may be provided in slot 55 defined in bottom 54 or bottom surface of bar 18. Light source 20 may be in electrical communication with a power supply 70 that supplies electrical current to light source 20. Power supply 70 may provide power from the tractor 12 or from an independent source of power, such as a battery or a solar electrical power generation device. Light source 20 may be any suitable source of illumination including, but not limited to, a strip 72 including at least one light emitting diode 74. The strip 72 may be applied to bottom 54 of the bar 18.

As shown in FIG. 1-FIG. 3, the fuel assembly 22 may include the at least one conduit 22A and the at least one connector 22B for loading and/or unloading fuel into and from the tank 14. The at least one connector 22B may be in operative communication with the interior volume 41 of the tank 14 and may be adapted to receive a loading hose 76 to transfer fuel into the tank 14. The bar 18 may be positioned above the at least one connector 22B. The bar 18 may be adapted to protect the tank 14 from being contacted by the loading hose 76 when the loading hose 76 is being connected to the at least one connector 22B to transfer the fuel into the tank 14.

As shown in FIG. 1-FIG. 3, the fuel assembly 22 may include five conduits 22A and five connectors 22B. The fuel assembly 22 including the conduits 22A and the connectors 22B may be operatively engaged with the tank 14 in any suitable manner as one of ordinary skill in the art would understand.

In one example, and as shown in FIG. 1, the conduits 22A and connectors 22B may be arranged linearly in a longitudinal direction. As shown in FIG. 1, the first connector 22B and the last connector 22B in the linear arrangement are separated by a distance "D" and the length L of bar 18 is greater than the distance D. In one example, this is important because the bar 18 is meant to protect the tank 14 when fuel is being loaded into the tank 14 and therefore the length L of bar 18 should be greater than the distance D. Further, the light source 20 provided on the bar 18 is meant to direct light to allow an operator to see, amongst other things, the connectors 22B, and, therefore, the length L of the bar 18 should be greater than the distance D. In other examples, the length L of bar 18 may be equal to or less than the distance D depending on the desired configuration, and, therefore, length L may be any suitable length.

As shown in FIG. 1-FIG. 3, tank 14 may further comprise a hose rack 78 provided adjacent the first side 28 of tank 14. Hose rack 78 may carry hoses 80 which may be utilized when transferring material from within the interior volume 41 to a desired location, such as a fuel reservoir.

In operation, and with reference to FIG. 1-FIG. 6, bar 18 may be positioned on tank 14 of tank trailer 10. Bar 18 may be disposed on the outer surface 38 of the tank 14 such that the bar 18 may be parallel to the longitudinal center line CL1. Bar 18 may be moved between a range of positions by moving the slot fastener 66 within the slot 62 and by rotating the first mounting member 58 about the pivot axis X1. Bar 18 may then be locked into a desired position by securing the slot fastener 66 at the desired position.

In accordance with one aspect of the present disclosure, the tank 14 may be loaded with fuel (not shown) via the loading hose 76. The loading hose 76 may be positioned above the tank 14 and connected to the at least one connector 22B to transfer fuel through the loading hose 76 to the interior volume 41 of the tank 14.

As shown in FIG. 2, the bar 18 may protect the tank 14 from being contacted by the loading hose 76 throughout the fuel loading process. For example, and as shown in FIG. 2, the fuel loading process may include vertically lowering the loading hose 76 and connecting it to the connector 22B to transfer fuel into the interior volume 41 of the tank 14. Once the fuel has been transferred, the loading hose 76 is removed from the connector 22B. Throughout the fuel loading process, the loading hose 76 may come into contact with the bar 18. If the bar 18 was not present, the loading hose 76 may come into contact with the tank 14 and cause damage to the tank 14.

With continued reference to FIG. 1 and FIG. 2, bar 18 may carry light source 20 and light source 20 may emit light generally vertically downwards to illuminate an area below the bar 18 which may be a working area when an operator 84 is loading and/or unloading fuel to and from the tank 14. The emitted light allows the operator 84 to see, amongst other things, the loading hose 76, the connectors 22B and the surrounding area in dark conditions.

As shown in FIG. 7-FIG. 12, and in accordance with a second embodiment of the present disclosure, trailer 210 may include a tank 214, a set of ground-engaging wheels 216, a bar 218 for protecting the tank, a light source 220 for lighting a work area in dark conditions, a fuel assembly 222 including at least one conduit 222A and at least one connector 222B, such as an API adapter, for loading and/or unloading fuel into and from the tank 214, a frame member 223 and a sheet material 225.

Tank 214 may include a first end 224 and a second end 226 defining a longitudinal direction therebetween, a first or left side 228 and a second or right side 230 defining a transverse direction therebetween and a top 232 and a bottom 234 defining a vertical direction therebetween.

For clarity, an explanation of some terms used herein is provided. Tank 214 may include an imaginary longitudinal center line CL3 (FIG. 11 and FIG. 12) or center plane which may be a vertical longitudinally extending plane cutting through the center of the tank 214 midway between the first and second sides thereof 228, 230 respectively. In accordance with one aspect of the present disclosure, various components may be longitudinal center line CL3 (FIG. 11 and FIG. 12) transversely offset or spaced from the center line CL3.

The description of tank 214 may make reference to certain components, sides, surfaces, points and the like as being inboard or outboard of one another, or this may be readily apparent from the Figures even without specific description. Such terms typically relate to the left or right halves of the tank 214, whereby, for instance, with regard to the left half (left of central plane CL3), a first point which is outboard of a second point is further to the left than the second point or further outboard than the second point in a first or left outboard direction, and thus the second point is inboard of or to the right of the first point. Thus, within the left half, the first point is further outboard or further from the central plane CL3 than is the second point. Likewise, with regard to the right half (right of central plane CL3), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from the central plane CL3 than is the fourth point.

Various surfaces may be said to face transversely inward or transversely outward, which may respectively mean facing generally toward or away from center line/plane CL3. Thus, on the left half of tank 214, a surface which faces transversely inward may be said to face generally to the right or rightward, and a surface which faces transversely outward may be said to face generally to the left or leftward. On the right half of tank 214, a surface which faces transversely inward may be said to face generally to the left or leftward, and a surface which faces transversely outward may be said to face generally to the right or rightward.

Similarly, various components, surfaces etc. may be said to extend transversely inward or transversely outward, which may respectively mean extending generally toward or away from center line/plane CL3. Thus, on the left half of tank 214, a component etc. which extends transversely inward may be said to extend generally to the right or rightward, and a component, etc. which extends transversely outward may be said to extend generally to the left or leftward. On the right half of tank 214, a component, etc. which extends transversely inward may be said to extend generally to the left or leftward, and a component etc. which extends transversely outward may be said to extend generally to the right or rightward.

Tank 214 may include an imaginary longitudinal center line CL4 (FIG. 11 and FIG. 12) or center plane which may be a horizontal longitudinally extending plane cutting through the center of the tank 214 midway between the top 232 of the tank 214 and the bottom 234 of the tank 214. In accordance with one aspect of the present disclosure, various components may be vertically offset or spaced from the center line CL4.

The description of tank 214 may make reference to certain components, sides, surfaces, points and the like as being above or below one another, or this may be readily apparent from the Figures even without specific description. Such terms typically relate to the top or bottom halves of the tank 214 whereby, for instance, with regard to the top half (above central plane CL4), a first point which is vertically above a second point is further vertically upwards than the second point, and thus the second point is vertically below the first point. Thus, within the top half, the first point is further vertically upwards or further from the central plane CL4 than is the second point. Likewise, with regard to the bottom half (bottom of central plane CL4), a third point which is vertically below a fourth point is further vertically downwards than the fourth point, and thus the fourth point is vertically above the third point. Thus, within the bottom half, the third point is vertically downwards or further from the central plane CL4 than is the fourth point.

Tank 214 may include an imaginary vertical tangent line TL2 (FIG. 11 and FIG. 12) or vertical plane which may be a vertically extending plane defined by a tangent to an outermost point 236 on the first side 228 of the tank 214. In accordance with one aspect of the present disclosure, various components may be transversely offset or spaced from the tangent line TL2.

Figure 11:
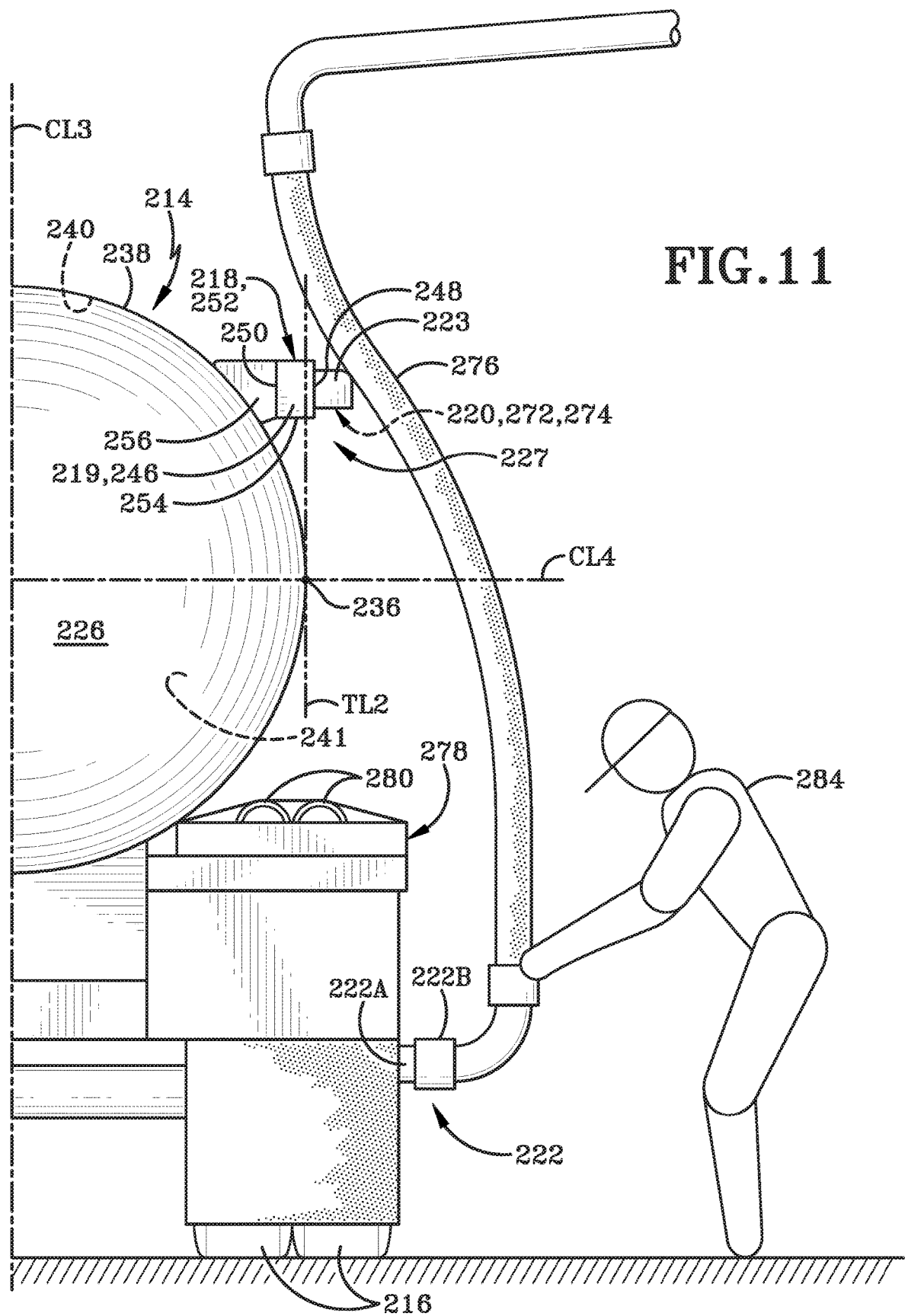
FIG. 11 is a rear fragmentary elevation view of the tank trailer of FIG. 7 where the bar and the frame member are preventing a loading hose from contacting the tank while the tank is being loaded with fuel.
Figure 12:
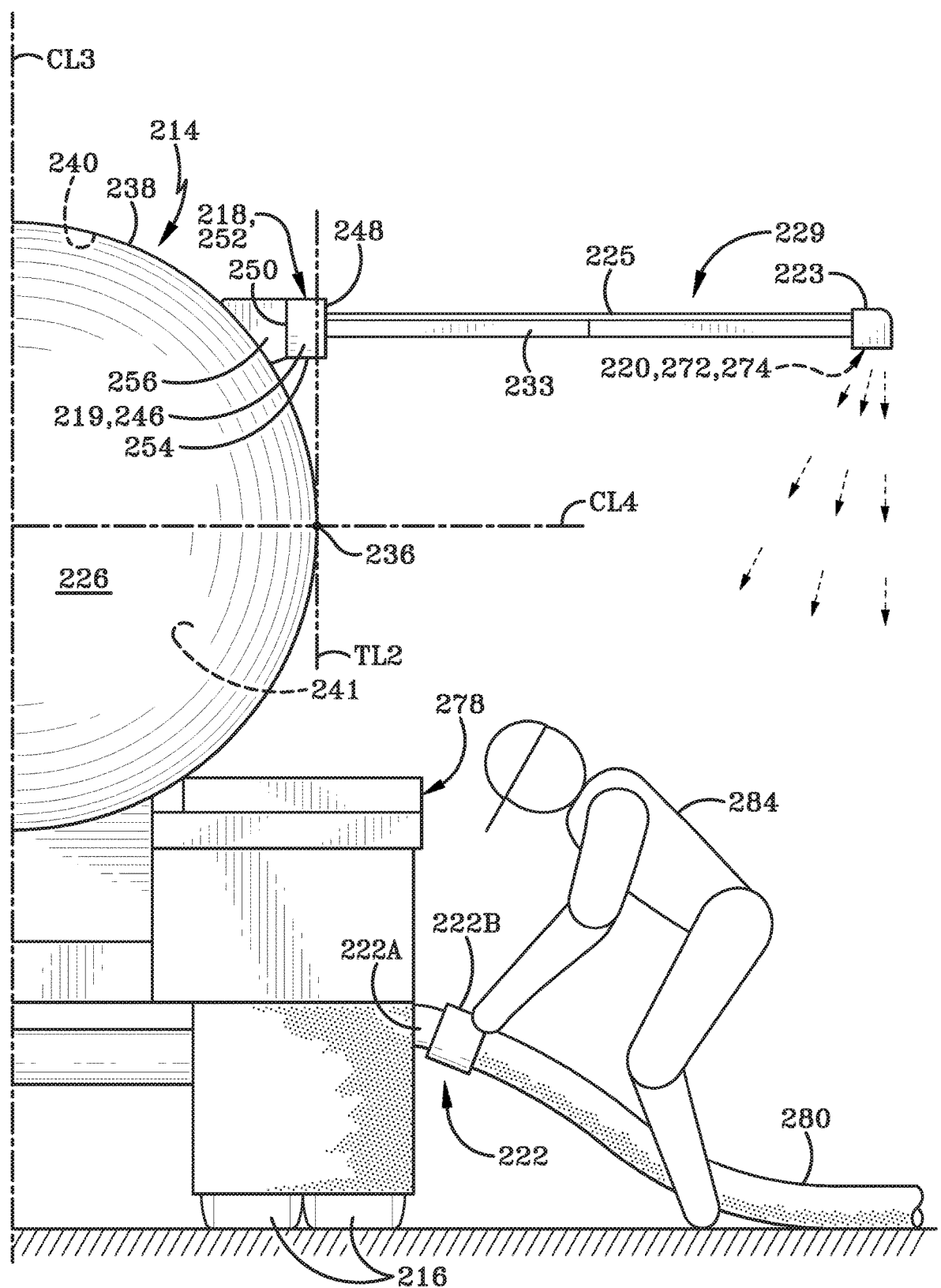
FIG. 12 is a rear fragmentary elevation view of the tank trailer of FIG. 7 where the sheet material is providing cover to an area below the sheet material while fuel is being unloaded.

With primary reference to FIG. 11 and FIG. 12, tank 214 may have an outer surface 238 facing away from the center line/plane CL3 and an inner surface 240 facing towards the center line/plane CL3 defining an interior volume 241 adapted to be filled with material (not shown). Tank 214 may be formed primarily of a metal, for instance, an aluminum alloy or other suitable metal.

Left and right sets of ground engaging wheels 216 may be rotatably mounted on trailer 210 about respective horizontal transversely extending axes via a suitable suspension assembly (not shown) as one of ordinary skill in the art would understand. Trailer 210 may include landing gear 242 (FIG. 7) generally adjacent first end 224 of tank 214. Landing gear 242 may be any suitable type known in the art and be configured to move between a lowered position in contact with the ground for supporting the front of trailer 210 when disconnected from the tractor 212 or other towing vehicle and a raised position out of contact with the ground when trailer 210 is hitched to the tractor 212 or towing vehicle for over the road travel.

Figure 7:
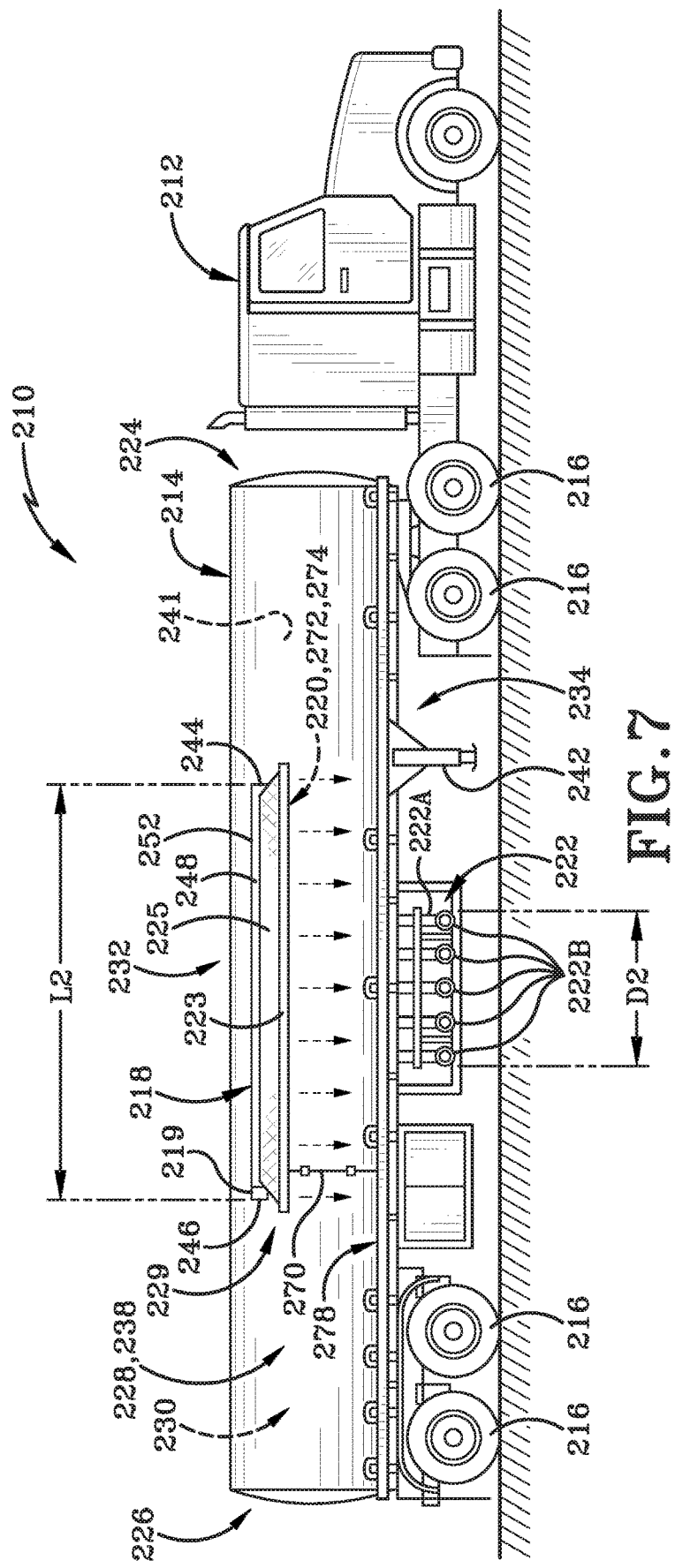
FIG. 7 is a right side elevation view of a tank trailer having a tank including a bar, a frame member and a light source in accordance with one embodiment of the present disclosure.
Figure 8:
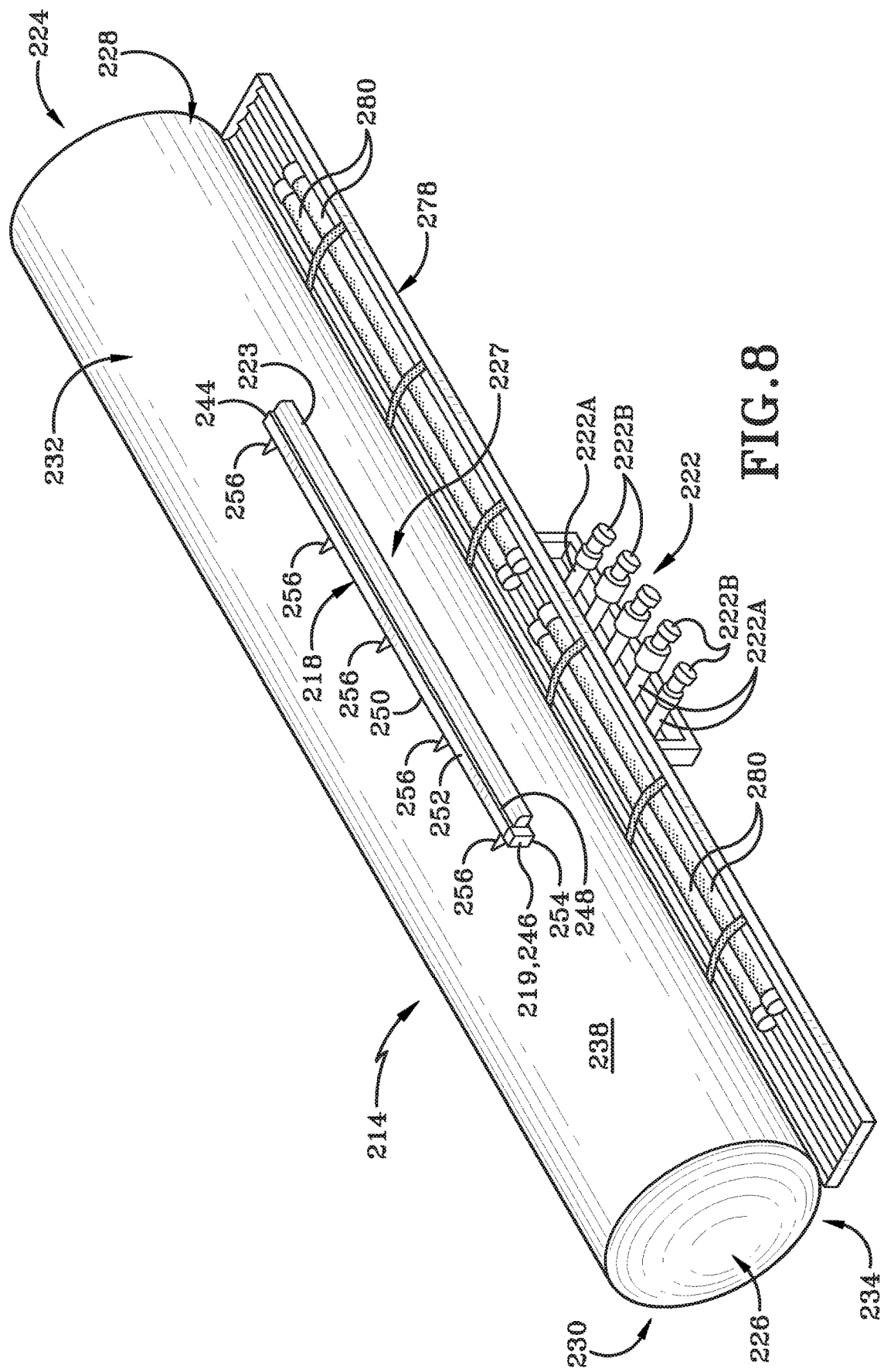
FIG. 8 is a top right rear isometric perspective view of the tank of FIG. 7 showing the bar and the frame member above a hose rack, conduits and connectors with the frame member in a first position.

As shown in FIG. 8, bar 218 may be a generally elongated member that has a generally rectangular cross-section; however bar 218 may be any suitable shape having any suitable cross-section such as a triangular, circular or square cross-section. Bar 218 may include a drive mechanism 219 for driving the frame member 223 between a first position 227 and a second position 229 as more fully described below. Bar 218 may be made of any suitable material such as metal or plastic. As shown in FIG. 7, bar may be mounted on first side 228 of tank 214 proximate the outer surface 238 of the tank 214. More specifically, bar 218 may be mounted above the fuel assembly 222, which includes the at least one conduit 222A and the at least one connector 222B, to protect the tank 214 from being contacted by an object, such as a hose, when fuel is being loaded into the tank 214.

As shown in FIG. 7-FIG. 12, bar 218 may include a first end 244, a second end 246, a first side 248, a second side 250, a top 252 and a bottom 254. Bar 218 may have a length "L2" (FIG. 8) that is measured from first end 244 of bar 218 to second end 246 of bar 218.

As shown in FIG. 7-FIG. 12, bar 218 may be fixedly secured to a mounting bracket 256 in any suitable manner such as by welding the bar 218 to the mounting bracket 256. Bar 218 may be mounted to the outer surface 238 of tank 214 via the mounting bracket 256. Mounting bracket 256 may be fixedly secured to the outer surface 238 in any suitable manner, such as by welding the mounting bracket 256 to the outer surface 238. As shown in FIG. 7-FIG. 9 and FIG. 11-FIG. 12, bar 218 may be positioned above the fuel assembly 222 which includes the at least one conduit 222A and the at least one connector 222B.

As shown in FIG. 11 and FIG. 12, the bar 218 may be positioned transversely away from the longitudinal center line CL3 and vertically above the longitudinal center line CL4. Further, and as shown in FIG. 12, the bar 218 may be positioned such that a portion of the bar 218 may be on an opposite side of the vertical tangent line TL2 than the first side 228 of the tank 214. It is further envisioned that the bar 218 may be pivotally mounted to the outer surface 238 of the tank 214 in any suitable manner.

Figure 9:
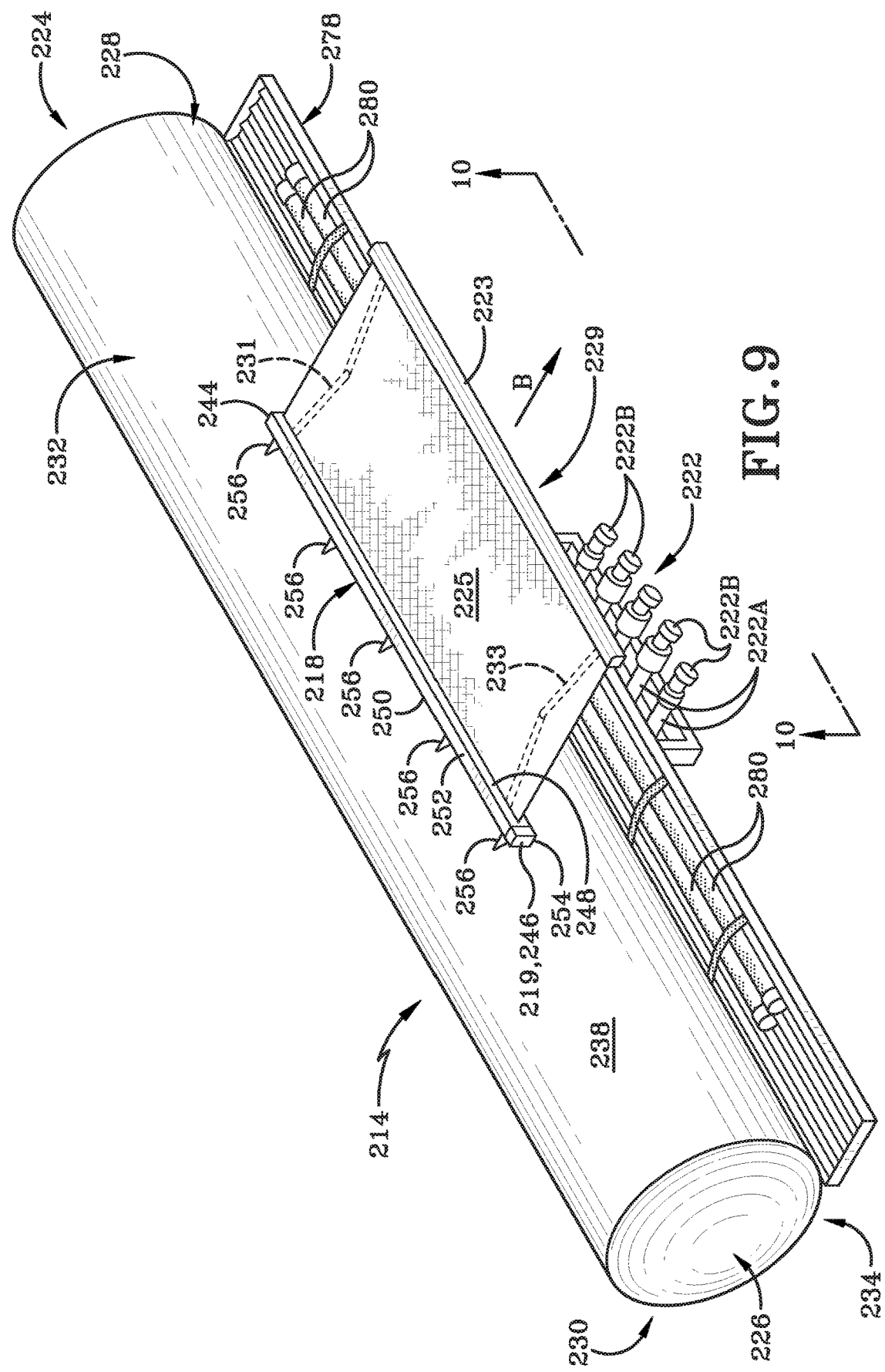
FIG. 9 is a top right rear isometric perspective view of the tank of FIG. 7 showing the bar and the frame member above a hose rack, conduits and connectors with the frame member in a second position.
Figure 10:
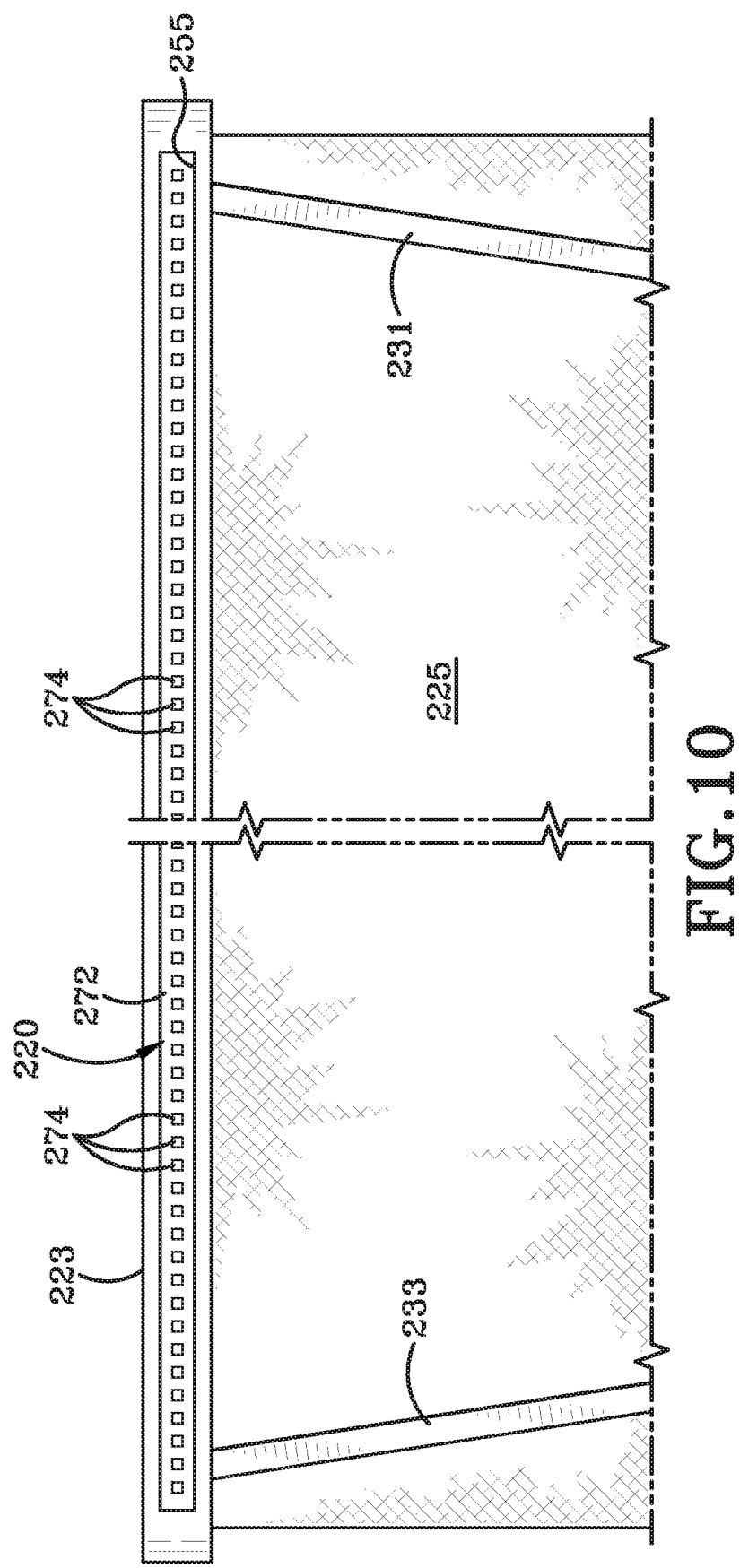
FIG. 10 is a bottom view of the frame member in the second position with a sheet material extending between the frame member and the bar.

As shown in FIG. 7-FIG. 9 and FIG. 11-FIG. 12, frame member 223 may be a generally elongated member that has a generally rectangular cross-section; however frame member 223 may be any suitable shape having any suitable cross-section such as a triangular, circular or square cross-section. As shown in FIG. 10, bottom surface of frame member 223 may define a slot 255 which may extend the length thereof. Frame member 223 may be operatively engaged with the bar 218 via a first extendable arm 231 and a second extendable arm 233. The drive mechanism 219 may move the frame member 223 between the first position 227 and the second position 229 by driving the first extendable arm 231 and the second extendable arm 233 from a retracted position to an extended position. The motion of the frame member 223 is indicated in FIG. 9 by an arrow "B". The frame member 223 may be transversely movable relative to the longitudinal center line CL3. Further, the frame member 223 may be transversely movable parallel to the longitudinal center line CL4.

As shown in FIG. 7, FIG. 9, FIG. 10 and FIG. 11-FIG. 12, the sheet material 225 may be operatively engaged with and extend between the bar 218 and the frame member 223. The sheet material 225 may be rollable around an internal portion (not shown) of the frame member 223 such that when the frame member 223 is in the first position 227, the sheet material 225 is rolled around the internal portion. As the frame member 223 moves away from first position 227, the sheet material 225 unrolls from the internal portion of the frame member 223 and extends between the bar 218 and the frame member 223. As such, the sheet material 225 may be adapted to provide cover to an area below the bar 218 and the frame member 223 when the frame member 223 is moved away from the first position 227. The sheet material 225 may be made of polyvinyl chloride (PVC), vinyl, acrylic, polyester, or any other suitable material.

As shown in FIG. 10-FIG. 12, light source 220 may be provided on frame member 223 to emit light towards a work area. More specifically, and in one example, light source 220 may be provided in slot 255 defined in bottom surface of frame member 223. Light source 220 may be in electrical communication with a power supply 270 that supplies electrical current to light source 220. Power supply 270 may provide power from the tractor 212 or from an independent source of power, such as a battery or a solar electrical power generation device. Light source 220 may be any suitable source of illumination including, but not limited to, a strip 272 including at least one light emitting diode 274. As shown in FIG. 10, the strip 272 may be applied to bottom surface of the frame member 223.

As shown FIG. 7-FIG. 9 and FIG. 11-FIG. 12, the fuel assembly 222 may include the at least one conduit 222A and the at least one connector 222B for loading and/or unloading fuel into and from the tank 214. The at least one connector 222B may be in operative communication with the interior volume 241 of the tank 214 and may be adapted to receive a loading hose 276 to transfer fuel into the tank 214. The bar 218 and the frame member 223 may be positioned above the at least one connector 222B. The bar 218 and the frame member 223 may be adapted to protect the tank 214 from being contacted by the loading hose 276 when the loading hose 276 is being connected to the at least one connector 222B to transfer the fuel into the tank 214.

As shown in FIG. 1-FIG. 3, the fuel assembly 222 may include five conduits 222A and five connectors 222B. The fuel assembly 222 including the conduits 222A and the connectors 222B may be operatively engaged with the tank 14 in any suitable manner as one of ordinary skill in the art would understand.

In one example, and as shown in FIGS. 7-9, the conduits 222A and connectors 222B may be arranged linearly in a longitudinal direction. As shown in FIG. 7, the first connector 222B and the last connector 222B in the linear arrangement are separated by a distance "D2" and the length L2 of bar 218 is greater than the distance D2. In one example, this is important because the bar 218 is meant to protect the tank 214 when fuel is being loaded into the tank 214 and therefore the length L2 of bar 218 should be greater than the distance D2. Further, the light source 220 provided on the bar 218 is meant to direct light to allow an operator to see, amongst other things, the connectors 222B, and, therefore, the length L2 of the bar 218 should be greater than the distance D2. In other examples, the length L2 of bar 218 may be equal to or less than the distance D2 depending on the desired configuration, and, therefore, length L2 may be any suitable length.

As shown in FIG. 7-FIG. 9, tank 214 may further comprise a hose rack 278 provided adjacent the first side 228 of tank 214. Hose rack 278 may carry hoses 280 which may be utilized when transferring material from within the interior volume 241 to a desired location, such as a fuel reservoir.

In operation, and with reference to FIG. 7-FIG. 12, bar 218 and frame member 223 may be disposed on tank 214 of tank trailer 210. Bar 218 and frame member 223 may be disposed on the outer surface 238 of the tank 214 such that the bar 18 and the frame member 223 may be parallel to the longitudinal center line CL3. Bar 218 and frame member 223 may be moved between the first position 227 and the second position 229 via the drive mechanism 219 and the first and second extendable arms 231 and 233 respectively.

In accordance with one aspect of the present disclosure, and as shown in FIG. 12, fuel (not shown) may be unloaded from the tank 214 via one of the hoses 280 by connecting the hose 280 to the connector 222B. As shown in FIG. 12, the sheet material 225 may provide cover to an operator 284 of the hose 280 while performing work in the area below adjacent the conduits 222A and connectors 222B. As shown in FIG. 11, it is further envisioned that the bar 218 and frame member 223 may protect the tank 214 from being contacted by a loading hose 276 throughout the fuel loading process when the frame member 223 is in the first position 227 and/or the second position 229 similar to the operation of bar 18 in FIG. 2.

With continued reference to FIG. 10-FIG. 12, frame member 223 may carry light source 220 and light source 220 may emit light generally vertically downwards to illuminate an area below the frame member 223 which may be a working area when an operator 284 is loading and/or unloading fuel to and from the tank 214. The emitted light allows the operator 284 to see, amongst other things, the loading hose 276, the connectors 222B and the surrounding area in dark conditions.

It is further envisioned that the first and second embodiment of the present disclosure may be utilized with other types of vehicles, including, but not limited to, cargo-carrying trucks (not shown).

Also, various inventive concepts may be embodied as one or more methods, of which an example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In accordance with one aspect of the present disclosure, an exemplary method for protecting a tank 14 and lighting a work area is provided. The method provides a tank 14 including a first end 24 and a second end 26 defining a longitudinal direction therebetween, a first or left side 28 and a second or right side 30 defining a transverse direction therebetween and a top 32 and a bottom 34 defining a vertical direction therebetween, an outer surface 38 and an inner surface 40 and a central longitudinal vertical plane CL1 extending between the first end 24 and the second end 26. The outer surface 38 faces away from the central longitudinal vertical plane CL1 and the inner surface 40 faces towards the central longitudinal vertical plane CL1. The outer surface 38 and the inner surface 40 define an interior volume 41 adapted to be filled with material. The tank trailer 10 further includes a set of ground-engaging wheels 16 supporting the tank trailer 10 from below, a bar 18 positioned proximate the outer surface 38 of the tank 14 and a light source 20 provided on the bar 18. The tank trailer 10 includes a connector 22B in operative communication with the interior volume 41 of the tank 14. The method includes positioning the bar 18 above the connector 22B. The method includes connecting a hose 76 to the connector 22B to transfer fuel and disconnecting the hose 76 when the transfer is completed. The bar 18 protects the tank 14 when connecting and disconnecting the hose 76 to the connectors 22B.

In accordance with one aspect of the present disclosure, an exemplary method for protecting a tank 14 and covering and lighting a work area is provided. The method provides a tank 214 including a first end 224 and a second end 226 defining a longitudinal direction therebetween, a first or left side 228 and a second or right side 230 defining a transverse direction therebetween and a top 232 and a bottom 234 defining a vertical direction therebetween, an outer surface 238 and an inner surface 240 and a central longitudinal vertical plane CL3 extending between the first end 224 and the second end 226. The outer surface 238 faces away from the central longitudinal vertical plane CL3 and the inner surface 240 faces towards the central longitudinal vertical plane CL3. The outer surface 238 and the inner surface 240 define an interior volume 241 adapted to be filled with material. The tank trailer 210 further includes a set of ground-engaging wheels 216 supporting the tank trailer 210 from below, a bar 218 positioned proximate the outer surface 238 of the tank 214, a frame member 223 operatively engaged with the bar 218 and a sheet material 225 extending between the bar 218 and the frame member 223. A light source 220 may be provided on the frame member 223. The tank trailer 10 includes a connector 22B in operative communication with the interior volume 241 of the tank 214. The method includes positioning the bar 218 and the frame member above the connector 22B. The method includes moving the frame member 223 from a first position 227 to a second position 229. The method includes unrolling the sheet material 225 from the frame member 223 when the frame member 223 moves away from the first position 227. The sheet material 225 is adapted to provide cover to an area below the bar 218 and the frame member 223 when the frame member 223 is moved away from the first position 227. The method may further include connecting a hose 276 to the connector 22B to transfer fuel and disconnecting the hose 276 when the transfer is completed. The bar 218 and the frame member 223 protect the tank 214 when connecting and disconnecting the hose 276 to the connectors 222B.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A tank trailer comprising:
a tank;
an outer surface of the tank;
an inner surface of the tank defining an interior volume adapted to be filled with material;
a fuel assembly of the tank trailer;
a set of ground-engaging wheels supporting the tank trailer from below;
a bar operably engaged with the tank; wherein at least a part of the bar is positioned directly above the fuel assembly of the tank trailer.

2. The tank trailer of claim 1, further comprising:
a first side of the tank;
a bottom of the tank;
at least one conduit of the fuel assembly in operative communication with the interior volume; wherein the at least one conduit is positioned vertically below the first side of the tank;
at least one connector operatively engaged with the at least one conduit; wherein the at least one connector is adapted to receive a hose to transfer fuel; wherein the bar is positioned above the at least one conduit and the at least one connector; and wherein the bar is adapted to protect the tank from being contacted by the hose.

3. The tank trailer of claim 1, further comprising:
a mounting bracket including a first mounting member and a second mounting member; wherein the first mounting member is engaged with the outer surface of the tank; wherein the first mounting member is engaged with the second mounting member;
a bar engaged with the second mounting member; and
a pivot fastener defining a pivot axis; wherein the pivot fastener is operably engaged with the first mounting member and the second mounting member; wherein the pivot fastener, the first mounting member, and the second mounting member allow pivotal movement of the bar about the pivot axis.

4. The tank trailer of claim 1, wherein the bar is selectively pivotable between a range of positions.

5. The tank trailer of claim 1, further comprising:
a light source provided on the bar.

6. The tank trailer of claim 5, further comprising:
a mounting bracket operably engaged with the tank and the bar; and
a slot of the mounting bracket; wherein the bar is pivotable about the slot.

7. The tank trailer of claim 5, further comprising:
a bottom surface of the bar defining a slot therein; wherein the light source is fixedly retained within the slot.

8. The tank trailer of claim 5, wherein the light source is operably connected to a strip.

9. The tank trailer of claim 8, further comprising:
a bottom surface of the bar; wherein the strip is applied to the bottom surface of the bar.

10. The tank trailer of claim 1, further comprising:
a first end of the tank;
a second end of the tank;
ground-engaging wheels of the set of ground-engaging positioned proximate the first end of the tank;
ground-engaging wheels of the set of ground-engaging wheels positioned proximate the second end of the tank;
landing gear positioned between the ground-engaging wheels positioned proximate the first end of the tank and the ground-engaging wheels positioned proximate the second end of the tank;
a first end of the bar; and
a second end of the bar; wherein the first end of the bar and the second end of the bar are positioned between the ground-engaging wheels positioned proximate the second end of the tank and the landing gear.

11. The tank trailer of claim 10, further comprising:
a top of the tank;
a bottom of the tank; wherein the bar is positioned closer to the top of the tank than the bottom of the tank.

12. The tank trailer of claim 11, further comprising:
a vertical tangential plane defined by an outermost point of the first side of the tank; wherein the bar is positioned on an opposite side of the vertical tangential plane than the first side of the tank.

13. The tank trailer of claim 1, further comprising:

a first end of the bar;

a second end of the bar;

a length of the bar defined between the first end of the bar and the second end of the bar;

at least two connectors of the fuel assembly; wherein the at least two connectors are linearly aligned; wherein the at least two connectors include a first connector and a last connector; and a distance defined between the first connector and the last connector; wherein the length of the bar is at least equal to the distance.

14. A method of protecting a tank trailer comprising:

operably engaging a bar with a tank; wherein at least a part of the bar is positioned directly above a fuel assembly of the tank trailer; and preventing contact, via the bar, between the tank and an object when fuel is being loaded into an interior volume of the tank.

15. The method of claim 14, wherein the object is a hose.

16. The method of claim 14, further comprising:

providing at least one conduit of the fuel assembly in operative communication with an interior volume of the tank;

positioning the at least one conduit vertically below a first side of the tank; and operatively engaging at least one connector with the at least one conduit; wherein the bar is positioned above the at least one conduit and the at least one connector.

17. The method of claim 14, further comprising:

providing at least one conduit of the fuel assembly in operative communication with an interior volume of the tank;

positioning the at least one conduit vertically below a first side of the tank; and operatively engaging at least one connector with the at least one conduit; wherein the bar is positioned above the at least one conduit and the at least one connector.

18. The method of claim 14, further comprising:

providing a light source on the bar; and illuminating a work area below the bar.

19. The method of claim 14, further comprising:

supporting, via a set of ground-engaging wheels, the tank trailer from below; and positioning the bar between at least one ground-engaging wheel of the set of ground-engaging wheels and a landing gear of the tank trailer.

20. The method of claim 14, further comprising:

pivotally mounting, via a mounting bracket, the bar to the tank.

* * * * *